United States Patent [19]

Koops et al.

[11] Patent Number: 5,552,054
[45] Date of Patent: Sep. 3, 1996

[54] COMPOSITE MEMBRANE, ITS APPLICATION AND PROCESS FOR THE DEHYDRATION OF ORGANIC SOLVENTS

[75] Inventors: Geert-Hendrik Koops, Tsukuba, Japan; Marcellinus H. V. Mulder; Cornelis A. Smolders, both of Enschede, Netherlands

[73] Assignee: Deutsche Carbone AG Membran-Trennverfahren GFT, Germany

[21] Appl. No.: 407,981

[22] Filed: Mar. 22, 1995

Related U.S. Application Data

[63] Continuation of Ser. No. 40,207, Apr. 1, 1993, abandoned.

[30] Foreign Application Priority Data

Apr. 3, 1992 [NL] Netherlands ............... 9200624

[51] Int. Cl.$^6$ .................................. B01D 61/36
[52] U.S. Cl. ............... 210/640; 210/500.42; 210/500.43
[58] Field of Search ............... 210/640, 500.42, 210/490, 500.41, 500.43, 500.27

[56] References Cited

U.S. PATENT DOCUMENTS

| | | |
|---|---|---|
| 3,950,247 | 4/1976 | Chiang et al. |
| 4,230,463 | 10/1980 | Henis et al. ............... 55/16 X |
| 4,761,232 | 8/1988 | Bright ............... 210/500.42 X |
| 4,931,181 | 6/1990 | Blume et al. |
| 5,028,337 | 7/1991 | Linder et al. ............... 210/644 X |
| 5,147,549 | 9/1992 | Chou et al. ............... 210/640 |

OTHER PUBLICATIONS

Patent Abstract of Japan vol. 11, No. 30 (C–400) 29 Jan. 1987 & JP.A.61 200 803 (Nakai Kenjiro) 5 Sep. 1986.
Patent Abstract of Japan vol. 3, No. 147 (C–66) 5 Dec. 1979 & JP.A.54 125 187 (Asahi Chem Ind Co Ltd) 28 Sep. 1979.

*Primary Examiner*—Frank Spear
*Attorney, Agent, or Firm*—D. Peter Hochberg; Mark Kusner; Michael Jaffe

[57] ABSTRACT

The invention relates to a composite membrane with a porous polymer support layer and a polymer top layer, whereby the porous polymer support layer is of polyacrylonitrile (PAN), polyacrylamide, polyetheretherketone (PEEK), polyetherketone (PEK), polysulfon or polyethersulfon, whereas the polymer top layer is a dense layer comprising polyvinyl chloride with selective water permeability. Preferably the membrane is provided with a porous polyacrilonitril support layer and a polyvinyl chloride top layer. Further the invention comprises the application of such a composite membrane for the dehydration of organic solvents using such a composite membrane.

2 Claims, 1 Drawing Sheet

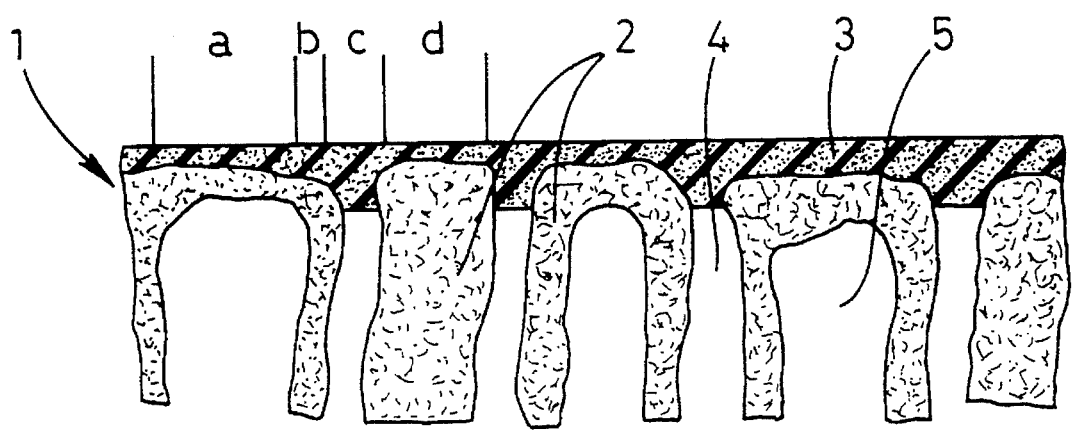

COMPOSITE MEMBRANE, ITS APPLICATION AND PROCESS FOR THE DEHYDRATION OF ORGANIC SOLVENTS

This is a continuation of application Ser. No. 08/040,207 filed on Apr. 1, 1993, now abandoned.

The invention relates to a composite membrane with a porous polymer support layer and a polymer top layer.

Such a composite membrane is known from DE 3.220.570. The known membrane comprises a porous support layer of polyacrylonitrile, polysulfon, etc., a top layer of polyvinyl alcohol or cellulose acetate, whereby the support layer usually is applied to a carrier layer such as a woven or non-woven material. According to DE 3.220.570 the top layer is responsible for the separation; nothing has been said about a possible contribution of the support layer to the selectivity.

The invention now contemplates to provide a membrane, which is especially suitable for the dehydration of organic solvents, especially acetic acid.

To this end the present invention provides a composite membrane with a porous polymer support layer and a polymer top layer, characterized in that the porous polymer support layer is polyacrylonitrile (PAN), polyacrylamide, polyetheretherketone (PEEK), polyetherketone (PEK), polysulfon or polyethersulfon, whereas the polymer top layer is a dense layer comprising polyvinyl chloride having selective water permeability.

The term layer comprising polyvinyl chloride means that it mainly consists of polyvinyl chloride or instead thereof a copolymer of PVC or modified PVC is applied.

However, besides polyvinyl chloride small amounts of another material may be present, such as polyvinyl acetate, polyvinyl alcohol, etc.

Usually polyvinyl chloride without other polymers is preferred.

This combination of the abovementioned porous polymer support layer and a dense top layer comprising polyvinyl chloride is particularly suitable for the dehydration of organic solvents at a high selectivity and a high flux.

Surprisingly it has been found according to the invention that a composite membrane with a porous polyacrylonitrile support layer and a dense polyvinyl chloride top layer are extremely suitable for the dehydration of concentrated acetic acid solutions at a temperature of 80° to 90° C. through a pervaporation process. This membrane appears to be especially resistant to such an agressive solution at 80° to 90° C. under guarantee of a high selectivity and a high flux, which is of great commercial importance in dehydration of acetic acid solutions in an economic manner.

At many applications it is desired that the composite membrane according to the invention is supported by a carrier layer, whereby the support layer rests on the carrier layer. The construction of such a composite membrane is therefore top layer, support layer and carrier layer. This is especially important in industrial applications of such composite membranes.

Usually a non-woven polyester is taken for the carrier layer, whereby, however, also other suitable materials may be applied.

In order to obtain good results the porous support layer possesses a surface porosity of 0 to $5 \times 10^{-2}$ $m^2/m^2$ and preferably a surface porosity of 0 to $1 \times 10^{-3}$ $m^2/m^2$.

The thickness of the top layer of the composite membrane according to the invention amounts to 0,05 to 5 μm, while a thickness of 0,1 to 5 μm is preferred.

In the dehydration of acetic acid solutions the process is carried out at 80° to 90° C.

Pervaporation is a separation process, in which a liquid mixture is contacted with a polymer membrane (=polymer film) and whereby on the other side of the membrane an inert carrier gas is flown along or a vacuum is applied. In this manner a partial pressure difference is created over the membrane being the operating force for substance transport, through which the components of the liquid mixture may dissolve in the membrane and may diffuse through the membrane. By a difference in solubility and diffusion rate there will permeate more from a certain component per unit of time as compared with the other component or components. The permeate leaves as a vapour the membrane and is subsequently condensed and collected. In this manner components of a liquid mixture may be separated from each other. This form of separation may only take place optimally if the separating layer of the membrane is densely packed and free of defects (leaks).

Pervaporation membranes are characterized in their selectivity and permeability, both properties depending on the material. The selectivity (α) is defined as:

$$\alpha(i/j) = \frac{(\text{concentration } i/\text{concentration } j) \text{ permeate}}{(\text{concentration } i/\text{concentration } j) \text{ feed}}$$

and the permeability is defined as being the amount of component, which permeates the membrane per square meter membrane surface, per unit of time, multiplied by the membrane thickness. The permeability divided by the membrane thickess gives the flux, usually expressed in the units $kg/m^2 \cdot hour$. An ideal pervaporation membrane has a high selectivity for the component to be separated with associated therewith a high membrane flux.

Pervaporation is an excellent separation process for the separation of mixtures forming an azeotrope or other mixtures being difficult to separate by means of destillation, like e.g. isomeric mixtures, water/ethanol, water/acetic acid, water/formic acid, etc.

As mentioned hereinbefore polyvinyl chloride (PVC) and polyacrylonitrile (PAN) appear to be extremely selective and also possess a good chemical resistance in the dehydration of organic solvents like ethanol, isopropanol, acetic acid and propionic acid. In order to obtain besides the high selectivity a flux being as high as possible, the total membrane thickness should be as small as possible. Homogeneous membranes thinner than ±5 μm loose their mechanical strength and for the dehydration of acetic acid it also appears that the selectivity of PVC and PAN membranes decreases when the membrane gets thinner, see table A.

TABLE A

Selectivity of PVC membranes as a function of the membrane thickness for dehydration of a 80/20% by weight of acetic acid/water mixture at 80° C.

| polymer | membrane thickness (μm) | concentration in permeate (water % by weight) | selectivity | flux ($kg/m^2 \cdot$ hour) |
|---|---|---|---|---|
| PVC | 17 | 99.5 | 796 | 0.017 |
| PVC | 11 | 99.4 | 663 | 0.035 |
| PVC | 9 | 99.3 | 567 | 0.039 |
| PVC | 3 | 98.3 | 231 | 0.149 |
| PAN | 31.5 | 99.9 | 2662 | 0.025 |
| PAN | 20 | 99.8 | 1996 | 0.040 |
| PAN | 6.5 | 98.7 | 304 | 0.115 |
| PAN | 3.5 | 89.0 | 32 | 0.216 |

However, now it appears that a laminated membrane, consisting of a dense, defect-free PVC film ironed on a dense, defect-free PAN-film, gives higher selectivities for the dehydration of acetic acid/water mixtures, especially with higher concentrations of acetic acid in the feed mixture, and it also appears that the selectivity is less depending on the thickness than with PVC and PAN alone, see table B and C.

TABLE B

Selectivity for PVC/PAN laminate membranes and PVC and PAN membranes as function of the feed concentration for the dehydration of an acetic acid/water mixture using pervaporation at 80° C.

| PVC thickness (μm) | PAN thickness (μm) | Feed concentration (water % by weight) | Permeate concentration (water % by weight) | Selectivity |
|---|---|---|---|---|
| 4.5 | 4.5 | 40.20 | 99.80 | 742 |
| 4.5 | 4.5 | 29.50 | 99.90 | 2387 |
| 4.5 | 4.5 | 19.90 | 99.92 | 5027 |
| 4.5 | 4.5 | 2.10 | 99.30 | 6613 |
| 20 | | 40.30 | 99.45 | 268 |
| 20 | | 29.50 | 99.30 | 339 |
| 20 | | 19.90 | 99.00 | 398 |
| 20 | | 2.0 | 62.70 | 82 |
| | 20 | 40.00 | 99.92 | 1874 |
| | 20 | 29.70 | 99.91 | 2628 |
| | 20 | 21.80 | 99.84 | 2238 |
| | 20 | 1.80 | 83.70 | 280 |

TABLE C

Selectivity for PVC/PAN laminate membranes as a function of the layer thickness for the dehydration of a 80/20% by weight acetic acid/water mixture using pervaporation at 80° C.

| PVC thickness (μm) | PAN thickness (μm) | Feed concentration (water % by weight) | Permeate concentration (water % by weight) | Selectivity |
|---|---|---|---|---|
| 2 | 11 | 20.00 | 99.90 | 3996 |
| 4.5 | 4.5 | 19.90 | 99.92 | 5027 |
| 3 | 3 | 21.10 | 99.00 | 370 |
| 1 | 2 | 21.20 | 98.90 | 334 |

The invention is now further elucidated with reference to the drawing.

The drawing is a schematic representation of a composite membrane according to the invention, however, without carrier layer.

A microporous asymmetrical PAN membrane, which serves as support layer for an ultrathin PVC coating may give, depending on the structure of the PAN support layer, an increased selectivity.

In the drawing 1 represents the composite membrane according to the invention. On the porous support layer 2 with pores 4 and cavities 5 the dense top layer 3 is applied.

From the drawing it follows that the composite membrane 1 is globally to be divided in three different areas, i.e. a, b and c.

If the porosity of the support layer is relatively small and the support layer in area a is sufficiently thin, then the contribution of the support layer to the selectivity of the composite membrane will be relatively large. Since it may be expected that the selectivity of area a is larger than the selectivity of area c (table C), then the selectivity of the composite membrane will increase as the porosity of the support layer decreases. Depending on the penetration depth of the top layer in the pore and the thickness of the support layer in area a the flux of the composite membrane will also change as the porosity of the support layer decreases.

In case of the support layer being polyacrylonitrile (PAN) the support layer is made by dissolving the polymer in N,N-dimethylformamide (DMF) and applying by using an ironing machine a homogeneous thin layer on a non-woven and subsequently coagulating in a water bath. As a consequence of liquid-liquid separation in this manner a porous support layer being attached to the non-woven arises. After that the PAN support layer is rinsed for one day with water it is submerged for 5 hours in an ethanol bath, followed by another 5 hours submersion in a hexane bath. Finally the PAN support layer is air-dried at room temperature. By increasing the PAN concentration in the ironing solution a lower porosity may be reached. These PAN support membranes may be characterized by measuring the permeability of air at a certain feed pressure, by measuring the pore radius as well as the porosity.

When the PAN support layers are dry they may be provided by a PVC coating under provision of the preferred membrane according to the invention. The solvent being used in order to dissolve the PVC may not attack the structure of the support layer. Tetrahydrofurane, a proper solvent for PVC, is such a solvent, which appears not to attack the structure of the support layer and which also properly moistens the PAN surface, so that a homogeneously distributed PVC coating layer is obtained.

The PVC coating may be applied by means of ironing of a diluted (0.5–10% by weight) PVC solution using an ironing roll or by means of a dip-coating technique, whereby the support layer is submerged in a diluted (0,5 to 10% by weight) PVC solution in such a manner that only the top of the support layer is moistened. For support layers of 25 by 20 cm this may be executed in practice by luting the support layer at the bottom (only at the marging) to a glass plate in such a manner that the PVC solution cannot moisten the support layer. Then the glass plate is located vertically in a glass box, which is only open on the top and is provided with a tap at the bottom. By filling the glass box with a diluted (0.5 to 10% by weight) PVC solution the PAN surface (on the upper side) is moistened, after 5 to 10 minutes waiting the tap on the bottom of the glass box is opened and the PVC solution slowly flows out of the glass box, leaving a thin PVC layer behind on the PAN support layer. After evaporation of the solvent the composite membrane may be removed from the glass plate and is then ready for use. In this manner PVC coating layers of 0.1 to 5 μm may be applied. In the literature dip-coating techniques have been described whereby many meters of support layer in one go may be treated and provided with a coating.

The invention will now be further elucidated with reference to the following examples, to which the invention is not limited.

EXAMPLE I

A polymer solution is prepared by dissolving 20% by weight of polyacrylonitrile (PAN A7, DuPont) in N,N-dimethylformamide. Of this polymer solution a thin homogeneously distributed layer was applied on a polyester non-woven after filtration and desaeration using an ironing machine with an ironing thickness of 0.25 mm. After a very short time this polymer film was coagulated in a water bath having a temperature of 17.5° C. After that the thus obtained support layer was rinsed in water for more than 1 day, followed by submersion in an ethanol bath for 5 hours, followed by submersion in a hexene bath for another 5 hours and this was air-dried. Thus a porous PAN support layer was obtained with a porosity of $1.65 \times 10^{-4}$ m$^2$/m$^2$, an average pore radius of 21.4 nm and an air permeability of 0.414 L/cm$^2$.min at a feed pressure of 2 bar. After complete drying of the support layer this was provided with a thin PVC layer using dip-coating as described hereinbefore. By using a 5% by weight PVC in tetrahydrofurane solution a PVC top layer of 0.8 μm was obtained. This membrane is subsequently measured through for 8 hours for the dehydration of acetic acid at 80° C., whereby on the permeate side a pressure was applied of 0.1 to 0.5 mmHg. By using a feed composition of 79.70% by weight of acetic acid and 20.30% by weight of water a selectivity was obtained of α=112 and a flux of 0.527 kg/m$^2$.hour. Of a feed composition of 98.60% by weight of acetic acid and 1.40% by weight of water a selectivity was obtained of α=74 and a flux of 0.277 kg/m$^2$.hour.

EXAMPLE II

A polymer solution was prepared by dissolving 25% by weight of polyacrilonitrile (PAN A7, DuPont) in N,N-dimethylformamide. According to the same procedure as in Example 1 a porous PAN support layer was obtained with a porosity of 6.24 ×10$^{-5}$ m$^2$m$^2$, an average pore radius of 10.1 nm and an air permeability of 0.096 L/cm$^2$.min at a feed pressure of 2 bar. After complete drying of the support layer this was provided with a thin PVC-layer using dip coating as described hereinbefore. By using a 5% by weight of PVC in tetrahydrofurane solution a PVC top layer was obtained of 1.0 μm. This membrane was subsequently measured through for 8 hours for the dehydration of acetic acid at 80° C., whereby at the permeate side a pressure of 0.1 to 0.5 mmHg was applied. By using a feed composition of 79.40% by weight of acetic acid and 20.60% by weight of water a selectivity was obtained of α=180 and a flux of 0.364 kg/m$^2$.hour. By using a feed composition of 98.50% by weight of acetic acid and 1.50% by weight of water a selectivity was obtained of α=318 and a flux of 0.126 kg/m$^2$.hour.

EXAMPLE III

A same support layer as in Example 2 was used and in the same manner provided with a PVC coating on the understanding that now a 3% by weight PVC solution was used. In this manner a composite membrane was obtained with a top layer of 0.3 μm. This membrane was subsequently measured through for 8 hours for the dehydration of acetic acid at 80° C., whereby at the permeate side a pressure of 0.1 to 0.5 mmHg was applied. By using a feed composition of 79.60% by weight of acetic acid and 20.40% by weight of water a selectivity was obtained of α=182 and a flux of 0.742 kg/m$^2$.hour. By using a feed composition of 98.00% by weight of acetic acid and 2.00% by weight of water a selectivity was obtained of α=206 and a flux of 0.153 kg/m$^2$.hour.

EXAMPLE IV

A polymer solution was obtained by dissolving 27.5% by weight of polyacrylonitrile (PAN A7, DuPont) in N,N-dimethylformamide. According to the same procedure as in Example I a porous PAN support layer was obtained with a porosity of 7.54×10$^{-6}$ m$^2$/m$^2$, an average pore radius of 8.2 nm and an air permeability of 0.032 L/cm$^2$.min at a feed pressure of 2 bar. After complete drying of the support layer this was provided with a thin PVC layer using dip-coating as described hereinbefore. By using a 3% by weight of PVC in tetrahydrofurane solution a top layer was obtained of 0.5 μm. This membrane was subsequently measured through for 8 hours for the dehydration of acetic acid at 80° C., whereby at the permeate side a pressure of 0.1 to 0.5 mmHg was applied. By using a feed composition of 79.80% by weight of acetic acid and 20.20% by weight of water a selectivity was obtained of α=274 and a flux of 0.558 kg/m$^2$.hour. Using a feed composition of 98.07% by weight of acetic acid and 1.93% by weight of water a selectivity was obtained of α=261 and a flux of 0.140 kg/m$^2$.hour.

We claim:

1. A process for dehydration of liquid acetic acid comprising the steps of:

providing a composite membrane comprised of a microporous polyacrylonitrile (PAN) support layer and a dense, defect-free and non-porous polyvinyl chloride film attached to one side thereof, said support layer having a thickness of less than 10 microns and said film having a thickness of between 0.05 micron to 10 microns, the overall thickness of said composite membrane having a thickness of less than 15 microns, maintaining a vacuum at the support layer side of said composite membrane, introducing a liquid acid solution containing between 0.5% to 90% by weight of water into contact with said film side of said composite membrane and maintaining said acid solution at between 40° to 100° C., and recovering permeate having a higher percentage of water than said acid solution from the support layer side of said composite membrane.

2. A process for dehydration of liquid acetic acid comprising the steps of:

providing a composite membrane comprised of a microporous polyacrylonitrile (PAN) support layer and a dense, defect-free and non-porous polyvinyl chloride film attached to one side thereof, said film having a thickness of between 0.05 micron to 10 microns, maintaining a vacuum at the support layer side of said composite membrane, introducing a liquid acid solution containing between 0.5% to 90% by weight of water into contact with said film side of said composite membrane and maintaining said acid solution at between 40° to 100° C., and recovering permeate having a higher percentage of water than said acid solution from the support layer side of said composite membrane.

* * * * *